(No Model.)
S. G. HOWE.
PIPE TESTING DEVICE.
No. 571,725. Patented Nov. 17, 1896.
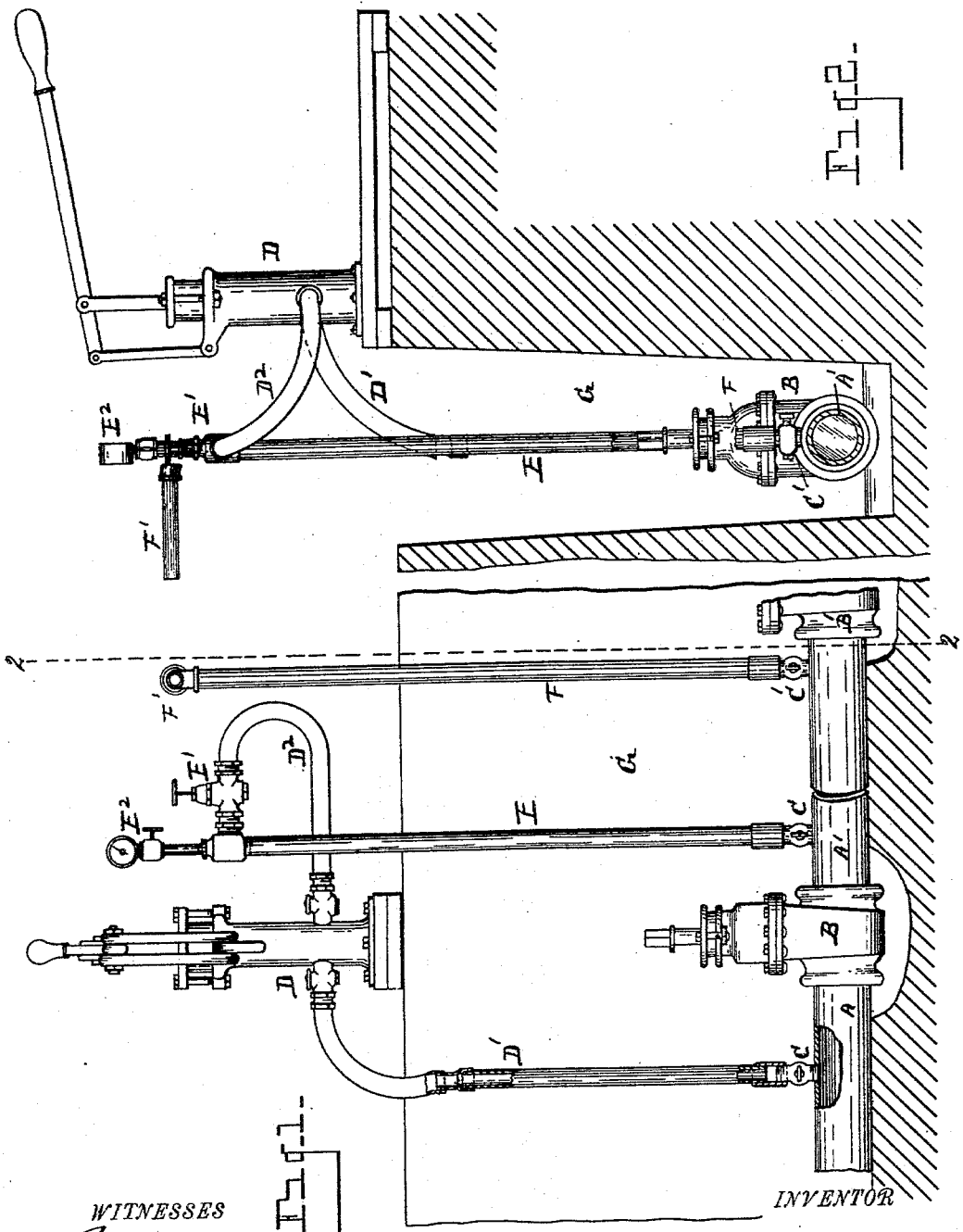
WITNESSES
John T. Miller
Lilla E. Gage
INVENTOR
Solon G. Howe
By his Attorney
Newell S. Wright.

UNITED STATES PATENT OFFICE.

SOLON G. HOWE, OF DETROIT, MICHIGAN.

PIPE-TESTING DEVICE.

SPECIFICATION forming part of Letters Patent No. 571,725, dated November 17, 1896.

Application filed July 30, 1896. Serial No. 601,083. (No model.)

*To all whom it may concern:*

Be it known that I, SOLON G. HOWE, a citizen of the United States, residing at Detroit, county of Wayne, State of Michigan, have invented a certain new and useful Improvement in Pipe-Testing Devices; and I declare the following to be a full, clear, and exact description of the invention, such as will enable others skilled in the art to which it appertains to make and use the same, reference being had to the accompanying drawings, which form a part of this specification.

My invention has for its object an improved pipe-testing device for testing the pressure in pipes, as in water-pipes, for example.

My invention consists of the construction, combination, and arrangement of devices hereinafter described and claimed, and illustrated in the accompanying drawings, in which—

Figure 1 is a view in elevation showing parts broken away. Fig. 2 is a view on the line 2 2, Fig. 1.

It is obviously desirable to test water-pipes, for example, in laying the same, to be sure that there is no leakage when water is let into the pipes under required pressure. My invention is adapted for such testing purposes and to provide means therefor of simple and economical construction, which may be readily operated with a saving of both time and more expensive apparatus.

I carry out my invention as follows:

A A' represent two adjacent lines of pipe provided with ordinary gates B therebetween. These gates being of ordinary construction need only to be shown in outline herewith.

C denotes service-cock connections which I locate on either side of said gates in the pipe-main A A'.

D represents any suitable pressure-pump, and E represents a pressure stand-pipe engaged with one of said service-cocks, as indicated in Fig. 1. The pressure-pump D is also connected with one of said service-cock connections, as by a connecting-pipe D'. The pump D and the pressure stand-pipe E are connected with service-cock connections on opposite sides of an intervening gate B. The pump is also connected with said pressure stand-pipe, as by means of a pipe $D^2$. The pressure stand-pipe E is provided with a valve E' and a pressure-gage $E^2$, the valve E' intervening between the gage and the pump. It will thus be seen that the service-cock connections on opposite sides of a gate in the pipe-main serve the one to control the inflow in the pump and the other the discharge from the pump. A third service-cock connection C' is located toward the extremity of a line of pipe adjacent to an additional gate B'.

F denotes an additional pipe leading from the service-cock connection C' upward. The service-cock connection C' and pipe F permit the free discharge of air from the line of pipe A' to be tested, and which may be closed when a desired amount of air has been discharged from said line of pipe. The pipe F is preferably carried upward sufficiently to discharge air and any water that may pass therethrough out of the excavation G, in which the pipe-main is located, and the pipe F may be provided with an arm F' to carry the water away from said excavation. The air and water are forced out of the pipe F under pressure.

By the provision of the valve E' between the pressure-gage $E^2$ and the pump it will be evident that water may be shut off whenever desired and the pump removed to another testing-place whenever a proper test has been made, while the pressure will still be maintained on the gage, the gage recording the condition of the test so long as the gates at the extremities of the line of pipe being tested are closed, the service-cock connection C', it will be understood, being also closed. In this manner the pressure in the pressure-gage and in the line of pipe being tested may be maintained for any desired length of time, so that the workman may disconnect the pump and proceed to test another line of pipe until the test indicated by the pressure-gage is properly inspected. The service-cock connections may remain in the pipe or they may be removed when the test is completed and the corresponding orifices in the pipe-main be plugged up in any desired manner. Thus with a single pump and a desired number of stand-pipes E and F, with their service-cock connections, a gang of men may readily effect the required test of the pipe quickly and economically.

The line to be tested is filled with water by opening the gate between the back section and new section, the valve in stand-pipe F being opened to let air that may be contained in the pipe to be tested escape. When the air is fully discharged and the pipe is filled solidly with water, the gate is closed between the sections and the pump operated until the proper degree of pressure is obtained, when, if there is no leak in the joints on the line, the valve between the pump and the stand-pipe E is closed. The pump and other appliances may then be moved for another test.

What I claim as my invention is—

1. In a pipe-testing device, the combination with adjacent pipe-mains, having a gate interposed therebetween, of service-cock connections located in the pipe-mains on either side of said gate, the one to control the inflow and the other the discharge, of a pressure-pump, and a third service-cock connection at the opposite extremity of a pipe-main to be tested to permit the free discharge of air from said pipe-main, substantially as described.

2. In a pipe-testing device, the combination with adjacent pipe-mains, having a gate interposed therebetween, of service-cock connections located in the pipe-mains on either side of said gate, the one to control the inflow and the other the discharge, of a pressure-pump, and a third service-cock connection at the opposite extremity of a pipe-main to be tested to permit the free discharge of air from said pipe-main, and a stand-pipe connected with one of said service-cock connections, having a pressure-gage, and a valve, for the purpose described.

3. In a pipe-testing device, the combination with pipe-mains, having a gate interposed therebetween, of service-cock connections located in said mains on opposite sides of said gate, a stand-pipe connected with one of said service-cock connections and provided with a pressure-gage, a pump connected with the other of said service-cock connections, and with said stand-pipe, said stand-pipe provided with a valve located between the pressure-gage and pump, and an additional service-cock connection located at the opposite extremity of the line of pipe being tested, to permit the discharge of air from said pipe, substantially as described.

In testimony whereof I sign this specification in the presence of two witnesses.

SOLON G. HOWE.

Witnesses:
N. S. WRIGHT,
O. B. BAENZIGER.